United States Patent
Hodges et al.

(10) Patent No.: US 7,433,462 B2
(45) Date of Patent: Oct. 7, 2008

(54) TECHNIQUES FOR IMPROVING TELEPHONE AUDIO QUALITY

(75) Inventors: Richard Hodges, Oakland, CA (US); David Roberts, Oakland, CA (US); Keith McMillen, Berkeley, CA (US); Leif Claesson, Oakland, CA (US); Sreevathsa G. Sreenivasa Reddy, El Cerrit, CA (US); Keith Edwards, Antioch, CA (US)

(73) Assignee: Plantronics, Inc, Santa Cruz, CA (US)

( * ) Notice: Subject to any disclaimer, the term of this patent is extended or adjusted under 35 U.S.C. 154(b) by 0 days.

(21) Appl. No.: 10/696,239

(22) Filed: Oct. 28, 2003

(65) Prior Publication Data
US 2004/0086107 A1    May 6, 2004

Related U.S. Application Data

(60) Provisional application No. 60/422,430, filed on Oct. 31, 2002.

(51) Int. Cl.
*H04M 1/00* (2006.01)
(52) U.S. Cl. .................................. 379/388.06
(58) Field of Classification Search ........................ None
See application file for complete search history.

(56) References Cited

U.S. PATENT DOCUMENTS

| | | | | |
|---|---|---|---|---|
| 3,567,873 A | 3/1971 | Peroni | ..... | 179/170.2 |
| 4,891,839 A | 1/1990 | Scheiber | ..... | 381/22 |
| 4,899,380 A * | 2/1990 | Shimada | ..... | 379/388.06 |
| 4,901,307 A | 2/1990 | Gilhousen et al. | ..... | 370/18 |
| 4,991,167 A | 2/1991 | Petri et al. | ..... | 370/32.1 |
| 5,179,730 A | 1/1993 | Loper | ..... | 455/266 |
| 5,263,019 A | 11/1993 | Chu | | |
| 5,303,306 A | 4/1994 | Brillhart et al. | ..... | 381/68 |
| 5,305,307 A | 4/1994 | Chu | | |
| 5,321,514 A | 6/1994 | Martinez | ..... | 348/723 |
| 5,365,583 A | 11/1994 | Huang et al. | | |
| 5,459,814 A | 10/1995 | Gupta et al. | ..... | 395/242 |
| 5,524,148 A | 6/1996 | Allen et al. | | |
| 5,550,924 A | 8/1996 | Helf et al. | | |
| 5,625,871 A | 4/1997 | Myer et al. | ..... | 455/33.1 |
| 5,668,794 A | 9/1997 | McCaslin et al. | ..... | 370/288 |
| 5,771,301 A | 6/1998 | Fuller et al. | ..... | 381/107 |
| 5,778,082 A | 7/1998 | Chu et al. | | |
| 5,787,183 A | 7/1998 | Chu et al. | | |
| 5,832,444 A | 11/1998 | Schmidt | | |

(Continued)

FOREIGN PATENT DOCUMENTS

EP    1 229 709 A2    8/2002

(Continued)

*Primary Examiner*—Ramnandan Singh

(57) ABSTRACT

Methods and apparatus are described for use with a near-end telephone. The near-end telephone is operable to generate an outgoing signal directed to a far-end telephone and to receive an incoming signal generated at least in part by the far-end telephone. A first signal processor is operable to dynamically adjust a first signal level associated with the outgoing signal with reference to the first signal level. A second signal processor is operable to dynamically adjust a second signal level associated with the incoming signal with reference to the second signal level. The first and second signal processors are further operable to control a loop gain to inhibit loop instability.

40 Claims, 7 Drawing Sheets

U.S. PATENT DOCUMENTS

| | | | |
|---|---|---|---|
| 5,893,056 A | 4/1999 | Saikaly et al. | 704/226 |
| 5,915,235 A | 6/1999 | DeJaco et al. | 704/234 |
| 5,943,645 A | 8/1999 | Ho et al. | 704/226 |
| 5,970,137 A * | 10/1999 | Le Damany et al. | 379/388.01 |
| 6,001,131 A | 12/1999 | Raman | 703/226 |
| 6,038,435 A | 3/2000 | Zhang | 455/234.1 |
| 6,044,162 A | 3/2000 | Mead et al. | 381/312 |
| 6,061,405 A | 5/2000 | Emami | 375/260 |
| 6,097,824 A | 8/2000 | Lindemann et al. | 381/315 |
| 6,118,878 A | 9/2000 | Jones | 381/72 |
| 6,130,943 A | 10/2000 | Hardy | 379/406 |
| 6,212,273 B1 | 4/2001 | Hemkumar et al. | |
| 6,226,380 B1 | 5/2001 | Ding | 379/410 |
| 6,282,176 B1 | 8/2001 | Hemkumar | |
| 6,285,767 B1 | 9/2001 | Klayman | 381/17 |
| 6,324,509 B1 | 11/2001 | Bi et al. | |
| 6,351,731 B1 | 2/2002 | Anderson et al. | |
| 6,381,570 B2 | 4/2002 | Li et al. | |
| 6,418,303 B1 | 7/2002 | Blackburn et al. | 455/234.2 |
| 6,434,246 B1 | 8/2002 | Kates et al. | |
| 6,721,411 B2 | 4/2004 | O'Malley et al. | |
| 6,731,767 B1 | 5/2004 | Blamey et al. | |
| 6,760,435 B1 * | 7/2004 | Etter et al. | 379/406.01 |
| 6,795,547 B1 * | 9/2004 | Bjarnason | 379/390.03 |
| 7,046,792 B2 * | 5/2006 | Harrow et al. | 379/388.06 |

FOREIGN PATENT DOCUMENTS

| | | |
|---|---|---|
| FR | 2 678 453 A1 | 12/1991 |
| NL | 1 920 962 | 11/1970 |
| WO | WO 98/56210 | 10/1998 |
| WO | WO 01/50714 A1 | 7/2001 |

* cited by examiner

US 7,433,462 B2

TECHNIQUES FOR IMPROVING TELEPHONE AUDIO QUALITY

RELATED APPLICATION DATA

The present application claims priority from U.S. Provisional Patent Application No. 60/422,430 for EXTERNAL AUDIO PROCESSOR FOR IMPROVING PHONE AUDIO QUALITY filed Oct. 31, 2002, the entire disclosure of which is incorporated herein by reference for all purposes.

BACKGROUND OF THE INVENTION

The present invention relates to audio signal processing and, specifically, to techniques for improving phone audio quality using adaptive volume control and a variety of signal processing techniques.

The sophistication of teleconferencing equipment and services has steadily increased as this mode of conducting business has become commonplace in the business world. However, as anyone familiar with these technologies can attest, there are significant shortcomings associated with even the most technologically advanced teleconferencing systems. Typically, these shortcomings relate to level problems, spectral imbalances, and background noise.

For example, a common problem with which most teleconferencing users are familiar relates to imbalance among the relative volume levels associated with the various parties participating in a conference call. That is, because of the different signal levels associated with different phone equipment and/or the relative positions of various speakers with respect to a particular phone, the voices of some participants are too loud, while others are often imperceptible. This is particularly the case for analog systems (which still comprise a significant portion of the market), although digital systems may also suffer from similar limitations. In addition, the relatively low fidelity of many telephone infrastructure components, and the resulting noise and distortion further negatively affect the intelligibility of reproduced voice signals.

It is therefore desirable to provide techniques by which volume imbalances in telephony applications may be mitigated. It is also desirable to provide such techniques which deal with other issues such as, for example, spectral imbalances and background noise.

SUMMARY OF THE INVENTION

According to various embodiments of the present invention, a variety of techniques including volume normalization and processing of audio signals are employed to improve the experience of users of telephone and teleconferencing services and equipment. According to a specific embodiment, the present invention provides a device for use with a near-end telephone. The near-end telephone is operable to generate an outgoing signal directed to a far-end telephone and to receive an incoming signal generated at least in part by the far-end telephone. A first signal processor is operable to dynamically adjust a first signal level associated with the outgoing signal with reference to the first signal level. A second signal processor is operable to dynamically adjust a second signal level associated with the incoming signal with reference to the second signal level. The first and second signal processors are further operable to control a loop gain to inhibit loop instability. According to some embodiments, the first and second signal processors are operable to control the loop gain by decreasing at least one of a first gain associated with the first signal processor and a second gain associated with the second signal processor with reference to a combined gain which represents at least a portion of the loop gain.

According to some embodiments, the combined gain includes a loss component determined with reference to the incoming and outgoing signals. According to a specific embodiment, the loss component comprises an estimate of an echo return loss which is determined with reference to a difference signal representative of a difference between a return energy signal corresponding to the incoming signal and an outgoing energy signal corresponding to the outgoing signal. According to an even more specific embodiment, the estimate deemphasizes speech energy in the incoming signal. In a specific implementation, this is achieved by increasing the estimate according to a time constant when the difference signal exceeds the estimate, and adjusting the estimate to match the difference signal when the difference signal drops below the estimate.

A further understanding of the nature and advantages of the present invention may be realized by reference to the remaining portions of the specification and the drawings.

DETAILED DESCRIPTION OF SPECIFIC EMBODIMENTS

Figure 1:
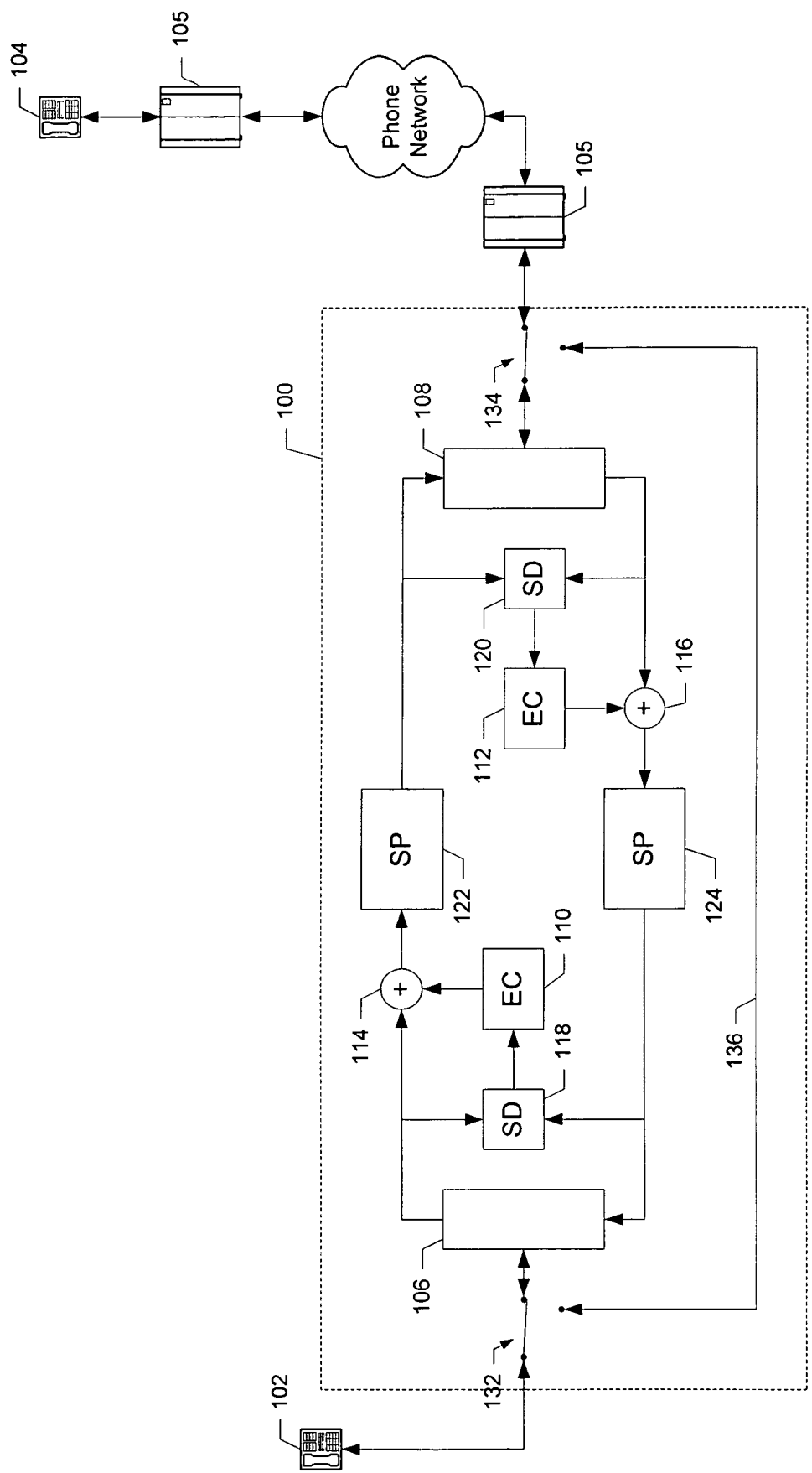
FIG. 1 is a simplified block diagram of a specific embodiment of the invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In addition, well known features may not have been described in detail to avoid unnecessarily obscuring the invention.

A specific embodiment of the present invention will now be described with reference to FIG. 1. The embodiment shown (i.e., unit 100) is employed with a conventional analog phone circuit in which the outgoing and incoming signals between phones 102 and 104 are transmitted simultaneously on a single pair of wires to and from a phone company central office 105. As will be understood, unit 100 includes circuitry (not shown) which provides all necessary voltages and impedance characteristics between the associated phone and the standard phone jack. It will also be understood, that the present invention may be implemented in digital phone circuits with suitable modifications.

The incoming and outgoing signals (i.e., the receive and transmit signals) are separated and/or combined using any of a variety of techniques including, for example, conventional hybrid circuits 106 and 108. The non-ideal nature of conventional hybrids results in a certain amount of echo at each end of a call. This echo is dealt with through the use of near-end and far-end echo cancellers 110 and 112 which may be implemented in hardware or software. The echo cancellers employ any of a wide variety of adaptive signal processing techniques to generate estimates of the near-end and far-end echoes with reference to the incoming and outgoing signals. The estimates are then subtracted (at 114 and 116) from the appropriate signal.

Each echo canceller works in conjunction with a speech detector (118 and 120) which determines whether incoming or outgoing speech is present, and causes the corresponding echo canceller to update or not accordingly. Speech detectors 118 and 120 may receive as inputs the outgoing and incoming signals as well as the respective error estimates generated by echo cancellers 110 and 112.

Each of the outgoing and incoming signal paths includes a signal processor 122 and 124 in which various aspects of the present invention may be implemented. According to a particular implementation, signal processors 122 and 124 include one or more automatic gain control (AGC) functions which respond to level imbalances substantially in real time. According to more specific embodiments, signal processor 122 and 124 include multi-band processors capable of addressing the spectral imbalances which detract from the intelligibility of the voice signals. According to various and more specific embodiments, the multi-band processing may be implemented as any of two, three, four, or five band processing.

Depending upon the widely varying output levels of different telephone equipment, the dynamic range of unit 100 may be more or less efficiently employed. Therefore, according to some embodiments, this issue is addressed by appropriately initializing the gain of signal processors 122 and 124. According to one such embodiment, each of processors 122 and 124 includes a relatively static input AGC and one or more dynamic AGCs. The input AGC for each processor is initialized at appropriate times, e.g., when unit 100 is powered up for outgoing processor 122, or when each new call begins for processor 124. This sets the operating points of the multi-band AGCs of the processors at their optimal points for the current conditions, i.e., the combination of equipment and associated signal levels for the current call.

In one embodiment, the gain of the input AGC is set with reference to the received signal strength such that the most or all of the dynamic ranges of the dynamic AGCs are available for dynamic gain control during the call. The dynamic AGC then effects gain control in response to the changing signal levels during the call. According to various embodiments, the dynamic AGCs implemented in signal processors 122 and 124 include wideband AGCs, multi-band AGCs, or combinations thereof. In general, a dynamic AGC employed by the present invention responds dynamically to an input signal, increasing its gain according to an attack rate where the input signal level is below some threshold, and decreasing its gain according to a release rate where the input signal level is above the threshold.

According to some such embodiments, the multi-band AGCs of signal processors 122 and 124 may be implemented in a wide variety of ways according to a wide variety of techniques. According to some embodiments, this multi-band signal processing is implemented according to the techniques described in commonly assigned, copending U.S. patent application Ser. No. 10/214,944 for DIGITAL SIGNAL PROCESSING TECHNIQUES FOR IMPROVING AUDIO CLARITY AND INTELLIGIBILITY filed Aug. 6, 2002, the entire disclosure of which is incorporated herein by reference for all purposes.

It should be noted that the various signal processing blocks described above and below may be implemented in a variety of ways without departing from the invention. For example, embodiments of the invention are contemplated in which these blocks are implemented in hardware, software, or a combination of both using one or more microprocessors, application-specific integrated circuits, programmable logic devices, etc. It will also be understood that the operation of the various blocks may be governed by elements within each block itself, or a central control, e.g., a microprocessor, and that the blocks are shown separately for clarity.

The boosting of the incoming and outgoing signals by signal processors 122 and 124 can have a variety of consequences which must be dealt with to ensure the integrity of the transmitted and received voice signals. For example, some phones with teleconferencing capabilities include a feature to mitigate echo by which local microphones are disabled under certain conditions, e.g., when speech is being received. Again, without the appropriate mechanisms in place, amplification of the incoming and outgoing signals by signal processors 122 and 124 could have the unintended effect of triggering the disabling of a microphone at an inappropriate time, i.e., when only background noise is being transmitted. Therefore, according to some embodiments, noise gating mechanisms, e.g., downward expanders, are included in the loop to reduce the gain under conditions where the signals being transmitted correspond to background noise rather than speech. Any of a wide variety of speech detection algorithms (including any described herein) may be employed to gate such mechanisms.

Moreover, without appropriate mechanisms in place, it could be possible for the overall system loop gain to exceed 1, and for the system to become unstable (e.g., characterized by high-pitched feedback noise at one or both phones). The circumstances under which this might occur include, for example, when the speech at both ends of a conversation is soft, and/or when the output signals from the phones are relatively low.

According to a particular set of implementations, this loop gain instability issue is addressed. According to one such implementation, a gain arbitration algorithm is employed in which an estimate of the total gain of the system is maintained, and the gain of various system elements is manipulated to try to prevent the loop gain from exceeding one. The positive contributions to the loop gain estimate include the gains associated with AGCs for each signal direction. These gains are known because they are dynamically controlled to effect the level normalization which is the primary function of the system.

The loop gain estimate also includes negative contributions representing the losses due to the hybrids and echo cancellation blocks on each end of the loop. According to a specific embodiment, the loss represented by one hybrid and the associated echo cancellation block is estimated by calculating a short term average of the energy going out and a short term average of the energy coming back, and taking the difference between those two values. In calculating these short term averages, it is important not to include energy corresponding to speech or other audio which is intended to be passed through.

Therefore, according to an even more specific embodiment, a technique for estimating this loss is provided which will be described with reference to FIG. 2, a block diagram representing some of the loop gain and loss components in the system of FIG. 1. In this diagram the gain components of signal processors 122 and 124 are represented by input automatic gain controls (AGCs) 202 and 204, downward expanders (DEs) 206 and 208 (i.e., for noise gating), wideband AGCs 210 and 212, multi-band AGCs 214 and 216, and multipliers 218 and 220. The losses attributable to the echo cancellation blocks and their associated hybrids are represented by blocks 222 and 224 and are equal to the difference between the energy going out of the system, i.e., $E_o$, and the energy returning, i.e., $E_r$.

Figure 3:
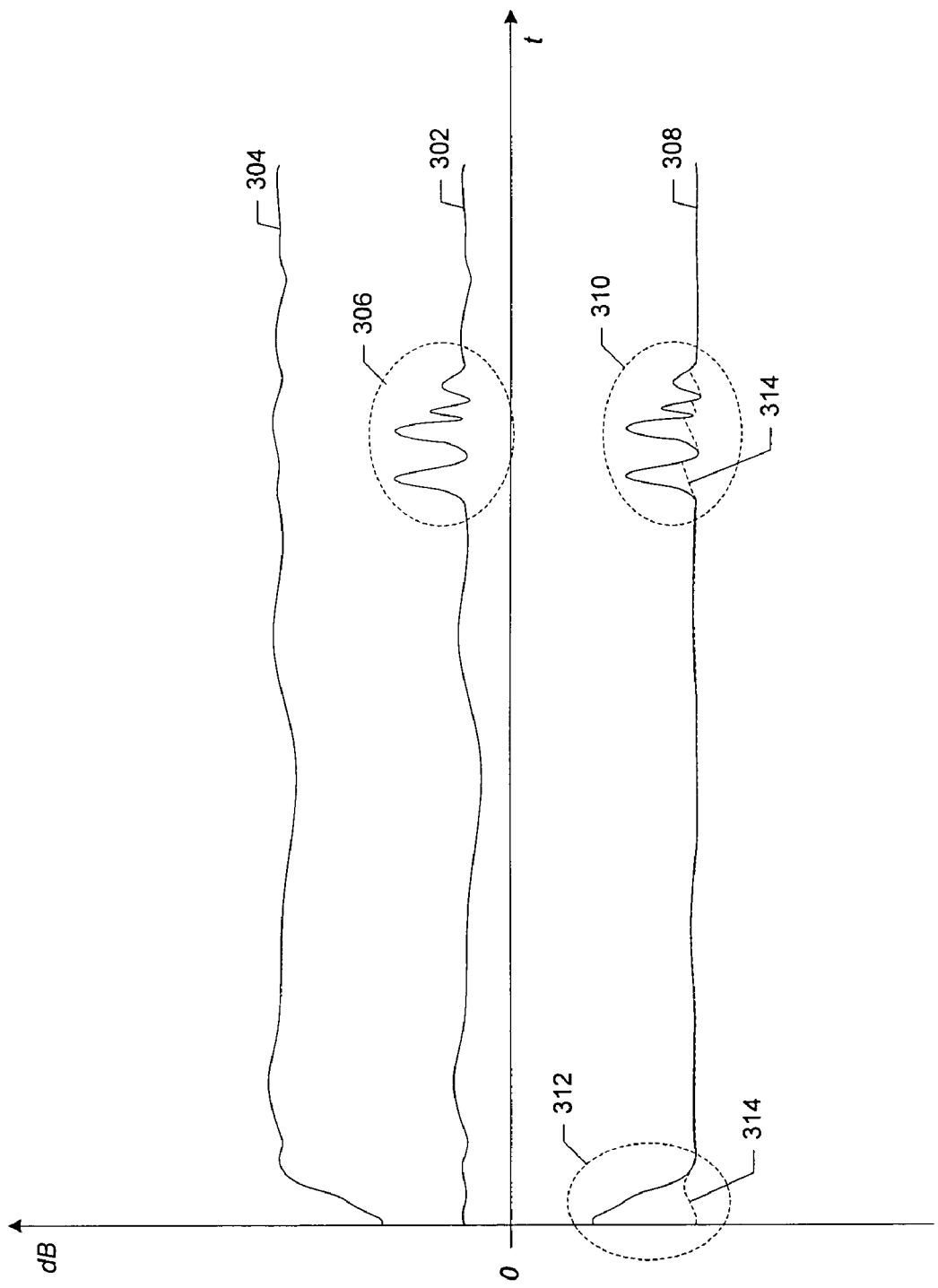
FIG. 3 illustrates some exemplary waveforms employed by a loss estimation algorithm for use with a specific embodiment of the invention.

An exemplary plot of $E_o$ and $E_r$ versus time and on a dB scale is shown in FIG. 3. It should be noted that, for the purpose of clarity, the waveforms in FIG. 3 have been adjusted in time to account for the round trip delays through the system. It should also be noted that some characteristics of the various waveforms may have been emphasized or exaggerated in some respects to more clearly illustrate the operation of the algorithm.

As would be expected, much of $E_r$ (waveform 302) appears to be an attenuated version of $E_o$ (waveform 304) because it is the "echo" of the originally outgoing sound. It is this portion of $E_r$ which is comparable with $E_o$ to get an estimate of the loss represented by the hybrid and the echo canceller. However, as mentioned above, a portion of $E_r$ (e.g., portion 306) may represent a voice signal from the other side of the call and should therefore not be included in the estimation of the loss.

Subtracting $E_o$ from $E_r$ results in a signal $E_r$-$E_o$ (waveform 308) which is representative of the loss associated with the hybrid and the echo canceller except where sound energy is being received from the other end of the phone call (e.g., portion 310). Another phenomenon occurs when the outgoing energy is extremely low, the necessarily non-zero positive nature of the incoming energy resulting in a hump (e.g., portion 312) in the difference waveform. In both of these situations, the difference waveform ends up not accurately reflecting the loss associated with the hybrid and the echo canceller.

Therefore, according to various embodiments, a "baseline tracking" algorithm is employed to "smooth out" these transient conditions in the difference waveform and to thereby result in a waveform which yields a loss estimate which can more reliably be used in maintaining the total loop gain to be less than unity.

Figure 4:
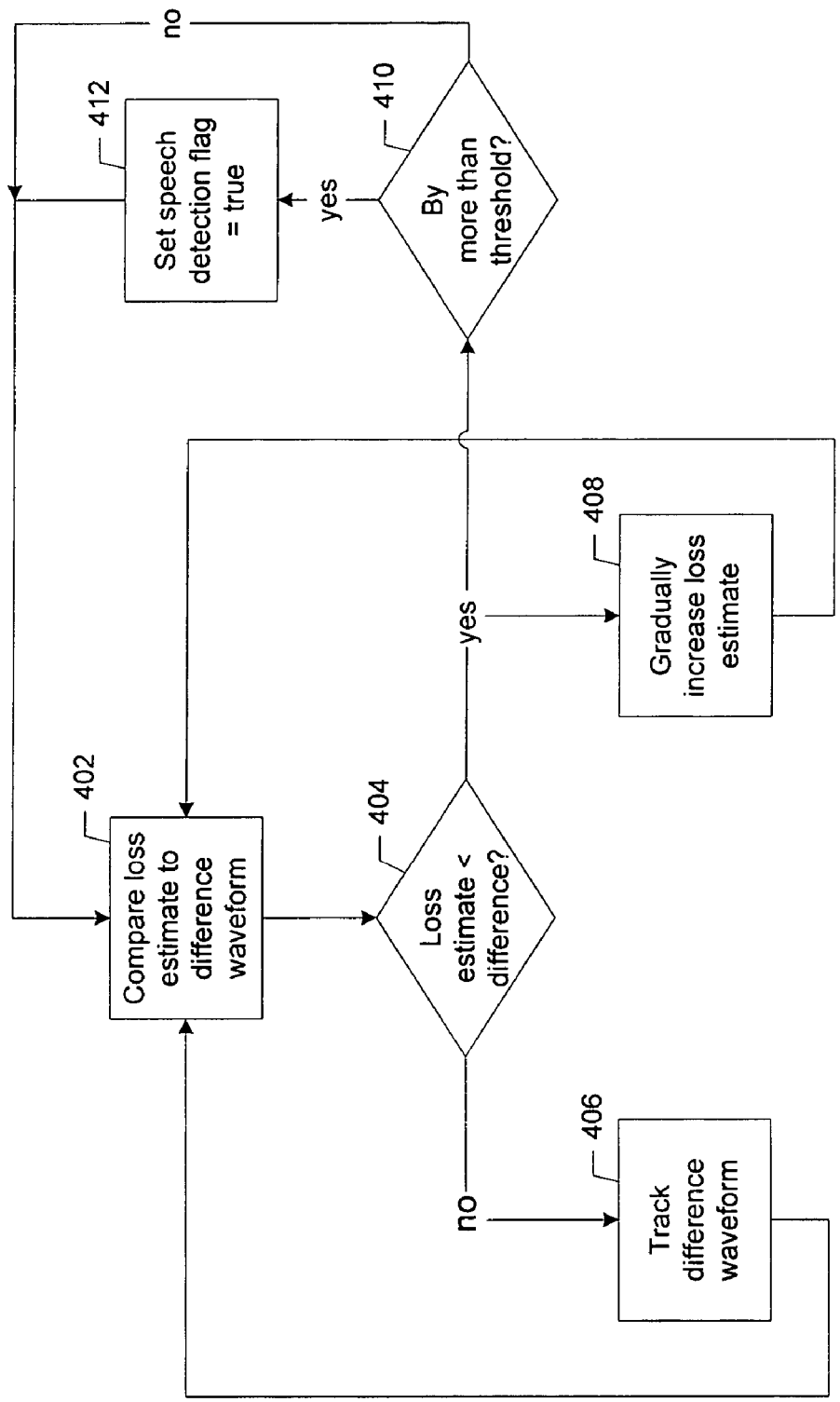
FIG. 4 is a flowchart illustrating the operation of a specific implementation of a loss estimation algorithm.

According to a particular implementation of the baseline tracking algorithm shown in FIG. 4, a loss estimate waveform 314 is compared with the difference waveform 308 (402). When difference waveform 308 drops below loss estimate waveform 314 (404), loss estimate waveform 314 is immediately adjusted to track the difference waveform 308 (406). On the other hand, when difference waveform 308 is above loss estimate waveform 314 (404), e.g., as might occur when $E_r$ contains voice energy from the far end, loss estimate waveform 314 is only gradually increased (408) until it hits difference waveform 308. According to various embodiments, the rate of increase is determined such that during normal bursts of energy from the other side only minimal change will occur in waveform 314. The loss estimate represented by waveform 314 is provided to the gain arbitration algorithm which tracks the total loop gain for the purpose of preventing situations where the total loop gain exceeds one.

According to a more specific embodiment, the above-described algorithm may be used to provide reliable far-end speech detection. That is, where difference waveform 308 is more than a certain amount above loss estimate waveform 314 (410), this portion of the $E_r$ waveform is assumed to be carrying speech energy from the far end (412). This turns out to be a reliable speech detection mechanism which may be used to deal with other issues such as, for example, double-talk situations (where both near and far-end speakers are talking).

Figure 5:
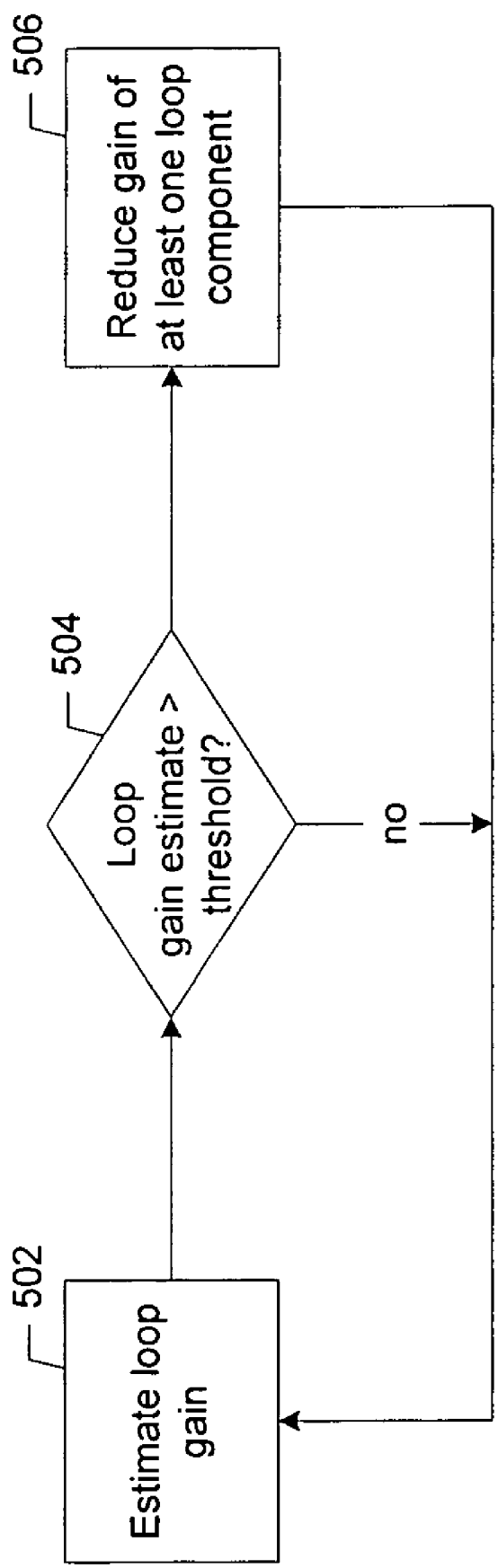
FIG. 5 is a flowchart illustrating operation of a specific implementation of a gain arbitration algorithm.

An exemplary implementation of a gain arbitration algorithm for use with the present invention will now be described with reference to FIG. 5. It should be understood that the loss estimates employed by this algorithm are not necessarily derived in the manner described above. It should also be noted that a useful gain arbitration algorithm need not account for every loss or gain element in the loop. For example, the contributions of peak limiters (not shown) may be ignored due to their transitory nature.

Referring once again to FIG. 2, input AGCs 202 and 204 adapt quasi-statically to the conditions of the connection with reference to the maximum energy level likely to occur during the call. The associated gain levels typically remain static unless energy levels during the call exceed expected levels in which case the gain is reduced. On the other hand, the gains for wideband AGCs 210 and 212 and multi-band AGCs 214 and 216 react dynamically to the changing energy levels during the call. Multipliers 218 and 220 reduce the gain by some fraction, e.g., half, of the corresponding input AGC gain.

According to one implementation, the gain arbitration algorithm estimates the loop gain G (502) with reference to the gains of input AGCs 202 and 204 (denoted $G_{1A}$ and $G_{1B}$, respectively), the gains of wideband AGCs 210 and 212 (denoted $G_{2A}$ and $G_{2B}$, respectively), the losses of multipliers 218 and 220 (denoted $G_{1A}/N$ and $G_{1B}/N$), and the loss estimates for the hybrids and echo cancellers in each direction (denoted $ERL_A$ and $ERL_B$). That is, according to this embodiment, the gain which is monitored by this algorithm is given by:

$$G = G_{1A} + G_{2A} - G_{1A}/N - ERL_A + G_{1B} + G_{2B} - G_{1B}/N - ERL_B \quad (1)$$

It should be noted that the value N may represent either a linear or nonlinear relationship between the gains of input AGCs 202 and 204 and their corresponding multipliers 218 and 220, respectively. It should also be noted that in this embodiment, the effects on the average loop gain of multi-band AGCs and the downward expanders are not taken into account. Other embodiments are contemplated in which either or both of these contributions may be included.

As mentioned above, if the total loop gain is greater than one (or 0 if measured in dB) (504), undesirable noise artifacts, e.g., feedback, will result. Therefore, according to various embodiments, the value of G is maintained below a certain level by the judicious manipulation of the gain levels associated with various ones of the loop's gain/loss elements (506). Although any of the gain elements in the loop may be manipulated individually or in various combinations, according to some implementations, only the gains associated with wideband AGCs 210 and 212 are manipulated.

According to one such implementation only the gain of one or the other of these wideband AGCs is typically manipulated. The decision as to which of the two is manipulated is made according to which of the corresponding signal paths is not currently being used to transmit speech energy (as determined, for example, by a speech detection algorithm). This is because the gain in that path is not currently needed, i.e., there is no speech energy, and the gain in the other path is there for a reason, i.e., to enhance the intelligibility of the speech being transmitted.

According to a more specific embodiment, where speech energy exists in both paths, the gain may be equally reduced in both of the wideband AGCs. It should be noted that this condition is relatively unlikely in that the condition in which the loop gain exceeds one typically occurs where one or both ends of the conversation are quiet, i.e., the gains are high when one or both sides are not speaking.

According to some implementations of a gain arbitration algorithm designed according to the invention, the necessary gain reductions are not achieved in a single step. Rather, gain is gradually removed from one or more loop elements according to a time constant. According to some embodiments, a suitable time constant might be such that it takes 100 to 500 milliseconds to reduce the gain.

According to some implementations, the condition in which the total loop gain exceeds one may be made less likely by freezing the gain in one or more of the AGCs when no speech is detected. That is, increases in gain are typically needed when speech is very soft, but are not needed when no one is speaking. Using a speech detection algorithm to distinguish between these two conditions and to gate the operation of the AGCs accordingly can therefore help to reduce the number of situations in which the gain arbitration algorithm might come into play. According to a specific embodiment, the gains of both the wideband and multi-band AGCs are frozen using such a mechanism.

Other embodiments of the invention deal with the requirement that the amplitudes of the two different DTMF tones must be within 6 dB of each other. According to one such embodiment, the multi-band signal processing is implemented to enforce an interdependence between the bands in which the respective tones are included such that this relationship is never violated. According to another embodiment, the widths of the various bands are set to ensure that both tones fall within the same band and are thus subjected to the same dynamic gain control. According to one such embodiment, two-band signal processing is implemented such that the entire range of DTMF frequencies fall within the same band.

Figure 2:
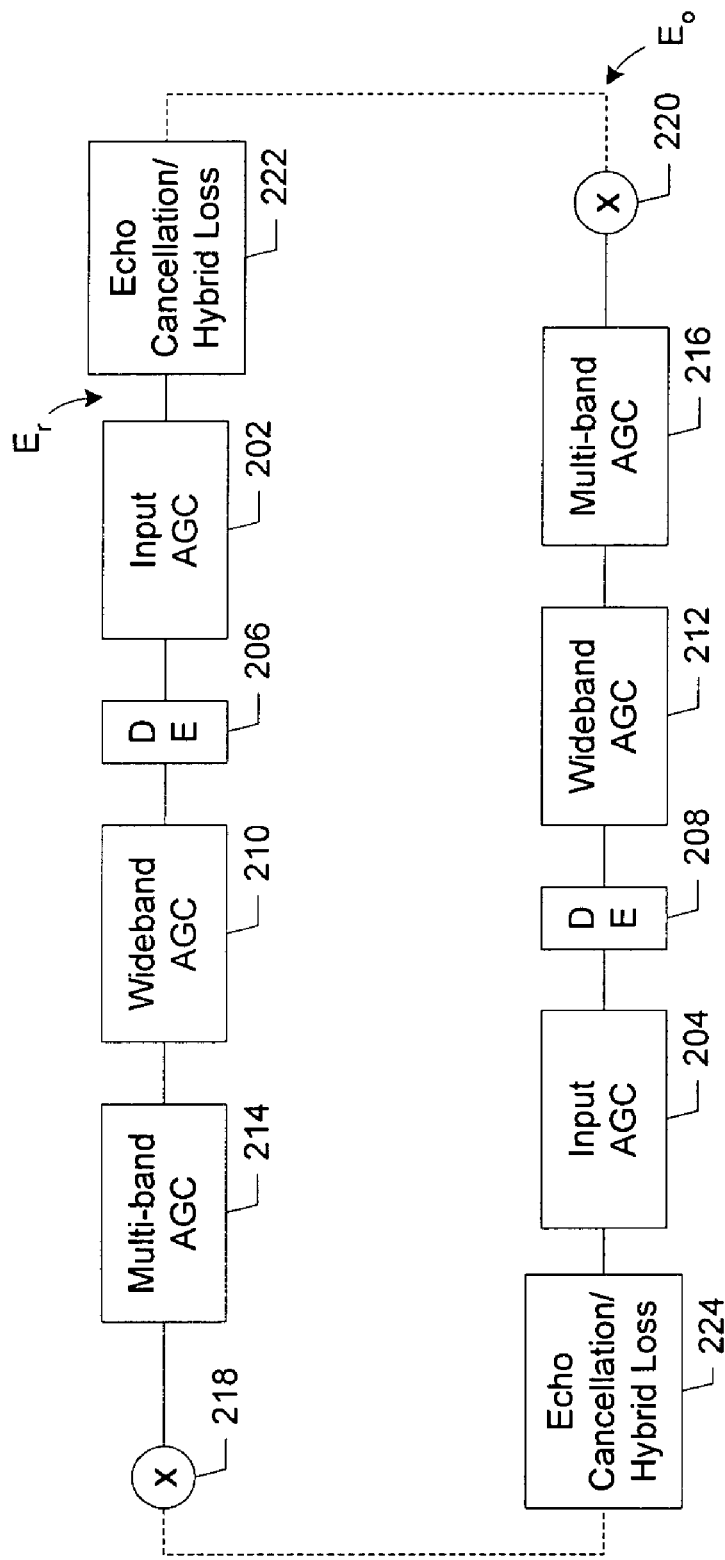
FIG. 2 is an alternative representation of portions of the block diagram of FIG. 1.

According to a particular embodiment of the invention of FIG. 1, a bypass circuit is provided with unit 100, i.e., relays 132, 134, and twisted pair 136, which is selected when the phone is on hook and when the phone is first picked up to accommodate ringing signals and services (e.g., Caller ID) provided by the phone company with which unit 100 might interfere. When the phone has been detected as being off hook for a sufficient period of time, unit 100 is switched into the circuit.

Figure 6:
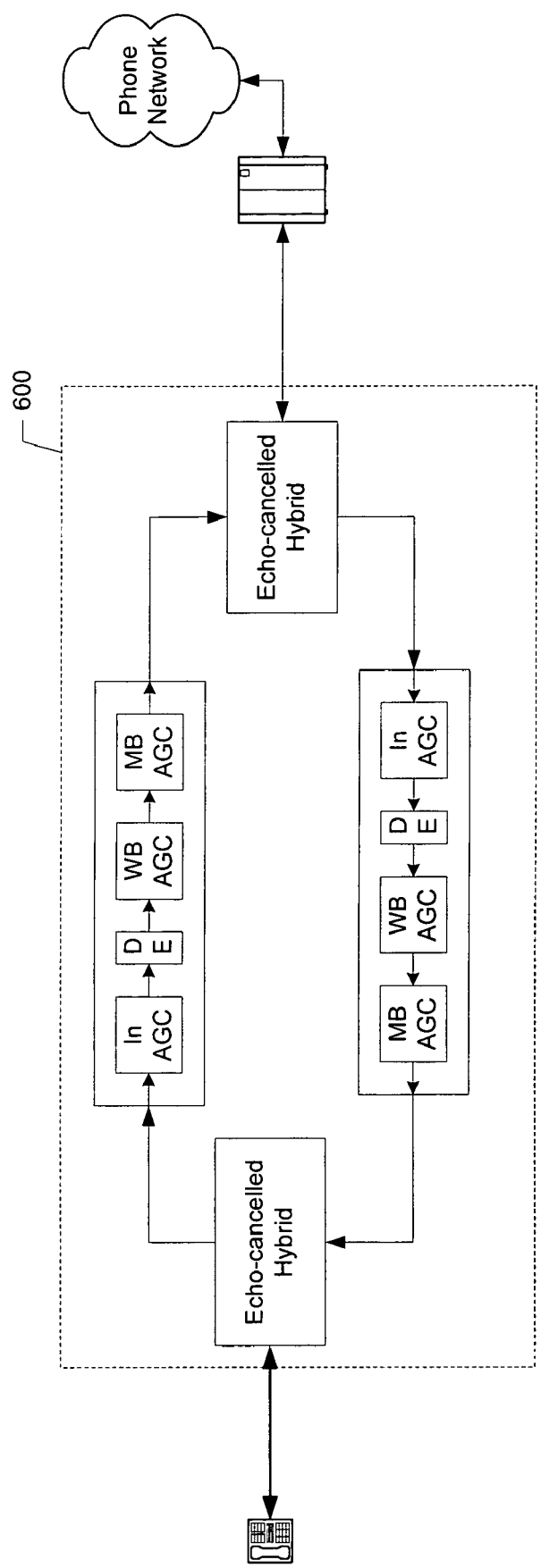
FIG. 6 is a simplified block diagram of an analog embodiment of the invention.
Figure 7:
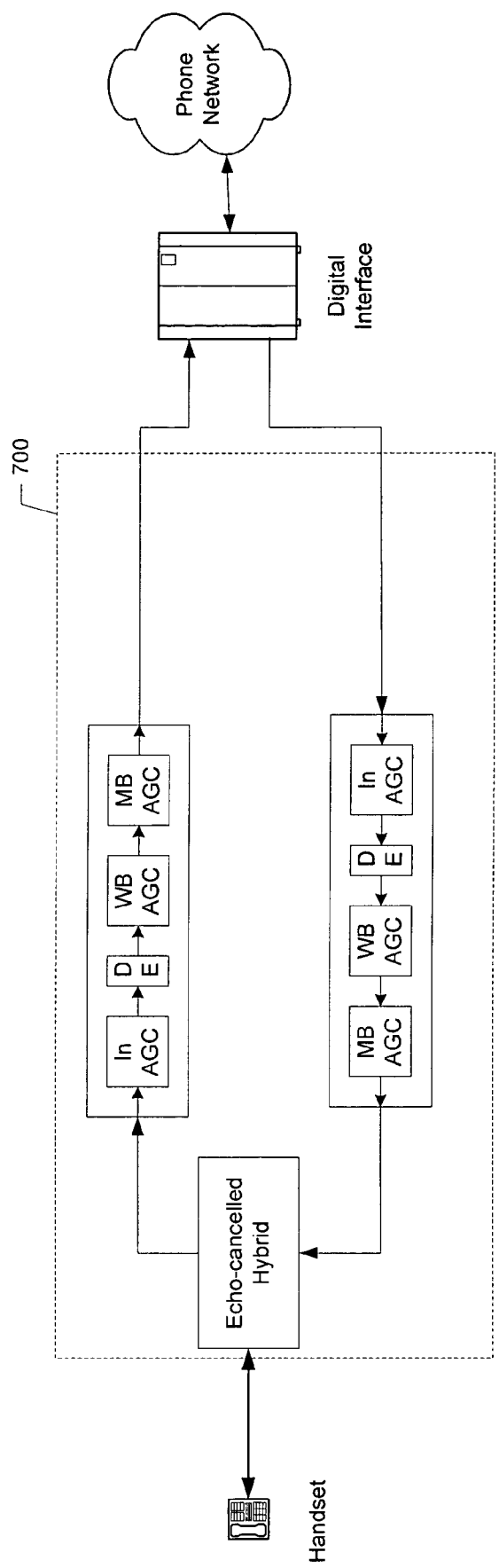
FIG. 7 is a simplified block diagram of a digital embodiment of the invention.

While the invention has been particularly shown and described with reference to specific embodiments thereof, it will be understood by those skilled in the art that changes in the form and details of the disclosed embodiments may be made without departing from the spirit or scope of the invention. For example and as mentioned above, many of the basic techniques described herein may be employed in digital phone circuits with appropriate modifications to ensure compatibility with any of the various digital PBX interface specifications provided by a variety of vendors, e.g., Siemens, Toshiba, Nortel, Alcatel, etc. FIGS. 6 and 7 are provided to illustrate the difference between exemplary embodiments for use with analog and digital systems, respectively.

FIG. 6 is a simplified block diagram of an analog phone system using a specific embodiment 600 of the present invention. By contrast, FIG. 7 is a block diagram of an exemplary digital phone system using another specific embodiment 700 of the present invention. In digital systems the connection to the phone network is 4-wire. Thus, in the embodiment of FIG. 7 there is no need for a hybrid on the phone network side as there is in the embodiment of FIG. 6. And because there is no hybrid-caused echo to cancel, there is no need for an echo canceller on this side. In such an embodiment, functions such as detection of speech energy coming from the phone network side become simpler because the energy of residual echo can be assumed to be zero.

It will be understood that, as with the embodiment of FIG. 1, the various blocks and signal paths shown in FIGS. 6 and 7 are logically distinct, but may be part of a centrally controlled process. Alternatively, some of the blocks in particular embodiments may be distinct both functionally as well as in terms of hardware.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A level adjusting device for use with a near-end telephone, the near-end telephone being operable to generate an outgoing signal directed to a far-end telephone and to receive an incoming signal generated at least in part by the far-end telephone, the device comprising:
   a first signal processor operable to dynamically adjust a first signal level associated with the outgoing signal with reference to the first signal level; and
   a second signal processor operable to dynamically adjust a second signal level associated with the incoming signal with reference to the second signal level;
   wherein the first and second signal processors are further operable to control a loop gain to inhibit loop instability, and wherein the first and second signal processors are operable to dynamically adjust the first and second signal levels in a plurality of frequency bands and wherein the each of the first and second signal processors comprises a static gain control component and a dynamic gain control component.

2. The device of claim 1, wherein the plurality of bands comprises one of 2, 3, 4, and 5 bands.

3. The device of claim 1, wherein the plurality of bands are selected such that a range of frequencies associated with DTMF signaling is entirely encompassed within a single band.

4. The device of claim 1 wherein the static gain component of each of the first and second signal processors is operable to set a static gain for each call, the static gain remaining unchanged for the duration of the corresponding call.

5. The device of claim 4 wherein the static gain is selected with reference to a dynamic range of the associated dynamic control component.

6. The device of claim 4 wherein the dynamic control component of each of the first and second signal processors is operable to dynamically adjust a dynamic gain for each call.

7. The device of claim 6 wherein the dynamic control component of each of the first and second signal processors is operable to dynamically adjust a plurality of dynamic gains for each call, each dynamic gain corresponding to one of the plurality of frequency bands.

8. The device of claim 6 wherein the dynamic control component of each of the first and second signal processors comprises a wideband component and a multi-band component.

9. The device of claim 1 wherein the incoming and outgoing signals comprise analog signals.

10. The device of claim 9 wherein the analog signals conform to one of a U.S. or international standard specification for connecting a telephone set to a telephone network.

11. The device of claim 9 further comprising circuitry for separating and combining the incoming and outgoing signals for processing by the first and second signal processors.

12. The device of claim 11 wherein the circuitry comprises first and second hybrids.

13. The device of claim 1 wherein the incoming and outgoing signals comprise digital signals.

14. The device of claim 13 wherein the digital signals conform to one of a plurality of specification for connecting a digital telephone set to a digital telephone network.

15. The device of claim 1 further comprising bypass circuitry operable to bypass the first and second signal processors.

16. The device of claim 15 wherein the bypass circuitry is operable to bypass the first and second signal processors until after the near-end telephone is determined to be off hook.

17. The device of claim 15 wherein the bypass circuitry comprises a twisted pair of conductors and a pair of relays operable to switch between the twisted pair and the first and second signal processors.

18. The device of claim 1 further comprising a near-end echo canceller operable to reduce echo in the outgoing signal, and a far-end echo canceller operable to reduce echo in the incoming signal.

19. The device of claim 18 further comprising a near-end speech detector for detecting near-end speech and controlling the near-end echo canceller in response thereto, and a far-end speech detector for detecting far-end speech and controlling the far-end echo canceller in response thereto.

20. The device of claim 1 wherein the first and second signal processors are operable to control the loop gain by decreasing at least one of a first gain associated with the first signal processor and a second gain associated with the second signal processor with reference to a combined gain which represents at least a portion of the loop gain.

21. The device of claim 20 wherein the first and second signal processors are operable to control the loop gain by decreasing the first gain when the outgoing signal does not correspond to outgoing speech energy, and decreasing the second gain when the incoming signal does not correspond to incoming speech energy.

22. The device of claim 20 wherein each of the first and second gains comprises a plurality of gain components each of which contributes to the combined gain.

23. The device of claim 22 wherein the first and second signal processors are operable to control the loop gain by decreasing only selected ones of the plurality of gain components.

24. The device of claim 22 wherein each of the gain components correspond to one of a static gain control block, a dynamic wideband gain control block, and a dynamic multi-band gain control block.

25. The device of claim 22 where the first and second signal processors are further operable to inhibit increases in selected ones of the gain components in the absence of speech energy.

26. The device of claim 20 wherein the combined gain includes a loss component determined with reference to the incoming and outgoing signals.

27. The device of claim 26 wherein the loss component comprises an estimate of an echo return loss.

28. The device of claim 27 wherein the estimate is determined with reference to a difference signal representative of a difference between a return energy signal corresponding to the incoming signal and an outgoing energy signal corresponding to the outgoing signal.

29. The device of claim 28 wherein the estimate deemphasizes speech energy in the incoming signal.

30. The device of claim 28 wherein when the difference signal exceeds the estimate, the estimate increases according to a time constant, and when the difference signal drops below the estimate, the estimate is adjusted to match the difference signal.

31. The device of claim 1 wherein the first and second signal processors comprise at least one computer readable medium having computer program instructions stored therein for effecting the dynamic adjustment of the first and second signal levels.

32. The device of claim 31 wherein the computer program instructions are operable to effect multi-band processing of an original sampled signal corresponding to one of the incoming and outgoing signals, the computer program instructions comprising:
   first instructions for separating the original sampled signal into a plurality of signal components each corresponding to one of the plurality of frequency bands;
   second instructions for independently and dynamically controlling a dynamic range associated with each one of the plurality of signal components;
   third instructions for modifying at least one signal level associated with the plurality of signal components; and
   fourth instructions for combining the signal components into a processed sampled signal.

33. The device of claim 32 wherein the first instructions separate the original sampled signal into one of 2,3,4, and 5 overlapping frequency bands.

34. The device of claim 32 wherein the second instructions effect nonlinear control of a gain factor associated with each of the signal components.

35. The device of claim 32 wherein the second instructions control the dynamic range associated with each of the signal components by applying a gain factor to each sample of each of the signal components, the gain factor being dynamically adjusted.

36. The device of claim 35 wherein the gain factor for each of the signal components is dynamically adjusted every first number of samples.

37. The device of claim 35 wherein the gain factor for each of the signal components is dynamically adjusted with reference to a threshold level to which each sample of each of the signal components is compared.

38. The device of claim 37 wherein the gain factor is adjusted upward using a release rate parameter where each sample is below the threshold level, and downward using an attack rate parameter where each sample is above the threshold level.

39. A level adjusting device for use with a near-end telephone, the near-end telephone being operable to generate an outgoing signal directed to a far-end telephone and to receive an incoming signal generated at least in part by the far-end telephone, the device comprising:
   a first signal processor operable to dynamically adjust a first signal level associated with the outgoing signal with reference to the first signal level; and a second signal processor operable to dynamically adjust a second signal level associated with the incoming signal with reference to the second signal level;

wherein the first and second signal processors are further operable to control a loop gain to inhibit loop instability and wherein the each of the signal processors comprises a static gain control component and a dynamic gain control component, the static gain control component being generally to statically adjust the corresponding signal level and is generally static at least for the duration of each telephone call and the dynamic gain control component being to dynamically adjust the corresponding signal level.

40. The device of claim 39, wherein the static gain component of each of the first and second signal processors is operable to set a static gain for each telephone call, the static gain remaining unchanged for the duration of the corresponding call.

* * * * *